US012686223B2

(12) United States Patent
Boutmans

(10) Patent No.: US 12,686,223 B2
(45) Date of Patent: Jul. 21, 2026

(54) METHOD FOR MANUFACTURING A DECOR SHEET FOR DECORATIVE PANEL

(71) Applicant: Unilin, BV, Wielsbeke (BE)

(72) Inventor: Beauregard Boutmans, Oudenaarde (BE)

(73) Assignee: Unilin, BV, Wielsbeke (BE)

( * ) Notice: Subject to any disclaimer, the term of this patent is extended or adjusted under 35 U.S.C. 154(b) by 144 days.

(21) Appl. No.: 18/719,719

(22) PCT Filed: Dec. 5, 2022

(86) PCT No.: PCT/IB2022/061775

§ 371 (c)(1),
(2) Date: Jun. 13, 2024

(87) PCT Pub. No.: WO2023/111767

PCT Pub. Date: Jun. 22, 2023

(65) Prior Publication Data

US 2025/0058574 A1 Feb. 20, 2025

(30) Foreign Application Priority Data

Dec. 16, 2021 (EP) .................................... 21215232

(51) Int. Cl.

| | |
|---|---|
| ***B41J 3/407*** | (2006.01) |
| ***B41M 5/00*** | (2006.01) |
| ***B44C 5/04*** | (2006.01) |

(52) U.S. Cl.

CPC ............ *B41M 5/0047* (2013.01); *B41J 3/407* (2013.01); *B41M 5/0017* (2013.01); *B44C 5/04* (2013.01)

(58) Field of Classification Search

CPC .... B41M 5/0047; B41M 5/0017; B41J 3/407; B44C 5/04

See application file for complete search history.

(56) References Cited

U.S. PATENT DOCUMENTS

| | | | | |
|---|---|---|---|---|
| 2010/0149567 | A1 | 6/2010 | Kanazawa et al. | |
| 2010/0189931 | A1 | 7/2010 | van der Zwan et al. | |
| 2020/0236249 | A1* | 7/2020 | Bouwens | B41J 3/407 |
| 2021/0213767 | A1* | 7/2021 | Meeus | B44C 5/0446 |

FOREIGN PATENT DOCUMENTS

| | | | |
|---|---|---|---|
| EP | 1872959 | B1 | 7/2009 |
| EP | 1290290 | B1 | 1/2010 |
| EP | 1857511 | B1 | 9/2011 |

(Continued)

*Primary Examiner* — Yaovi M Ameh

(74) *Attorney, Agent, or Firm* — Capitol City TechLaw

(57) ABSTRACT

A method is provided for manufacturing a decorative sheet for decorative panels. The method may involve providing a first printed substrate having a printed color patch having at least one printed color spot. The first printed substrate may be subjected to at least a predetermined operation that causes a color shift of the color spot. A first color coordinate set may be determined for the color spot. A first ICC profile may be determined using the first color coordinate set. A first master image may be visualized on a display device using the first ICC profile. An image processing operation may be performed on the first master image to obtain a second master image during the visualization. The second master image may be printed on a second substrate to obtain the decorative layer.

20 Claims, 3 Drawing Sheets

(56) References Cited

FOREIGN PATENT DOCUMENTS

| | | | | |
|---|---|---|---|---|
| EP | 2293946 | B1 | 1/2012 | |
| EP | 2431190 | B1 | 9/2013 | |
| EP | 2905145 | B1 * | 10/2019 | ................ B41J 2/01 |
| JP | 2021-17051 | A | 2/2021 | |
| WO | 2011124503 | A2 | 10/2011 | |
| WO | WO-2014084787 | A1 * | 6/2014 | .......... B41M 5/0041 |
| WO | 2015118451 | A1 | 8/2015 | |
| WO | 2015140682 | A1 | 9/2015 | |

* cited by examiner

II
PU

METHOD FOR MANUFACTURING A DECOR SHEET FOR DECORATIVE PANEL

This application claims priority under 35 USC § 119 (a)-(d) from EP patent application Ser. No. 21/215,232.6, which was filed on Dec. 16, 2021, the entire content of which is incorporated herein by reference.

BACKGROUND

1. Field

The present invention relates to a method for manufacturing decorative sheets of the type used in panels having a decorative surface, or so-called decorative panels. The invention also relates to a method for manufacturing such panels.

Preferably the panels obtainable with the method of the invention may relate to furniture panels, ceiling panels, flooring panels or similar, wherein these panels preferably comprise a wood-based substrate, such as an MDF or HDF substrate (Medium or High Density Fiberboard) or a substrate material consisting of or essentially made of wood particleboard. In alternative embodiments the panel can comprise a polymeric based substrate, preferably thermoplastic based substrate, such as PVC (Polyvinyl chloride), PP (Polypropylene), LVT (Luxury Vinyl Tile), SPC (Solid Polymer Composite) or WPC (Wood polymer composite) based substrate. The invention can further relate to mineral-based board of cement-based board, like for example, fiber cement based board or magnesium oxide based board.

The invention is of particular interest when the decorative sheet has to be used in a panel manufacturing process in which one or more steps involve a heat or press treatment, for example heat pressing or thermal lamination.

2. Related Art

Traditionally, the decor or pattern of such panels is printed on a printable substrate, for example a paper sheet or a thermoplastic foil, by means of offset or rotogravure printing. The obtained décor paper is taken up as a decorative paper in a so-called laminate panel. For manufacturing the panels the DPL process can be practiced. According to the DPL process (Direct Pressure Laminate) the already printed paper or decorative paper is provided with melamine resin to form a decorative layer. Afterwards a stack is formed comprising at least a plate shaped substrate, said decorative layer and possibly a protective layer on top of said decorative layer, wherein said protective layer or overlay is based on resin and/or paper as well. Said stack is pressed and the press treatment results in a mutual connection or adherence of the decorative paper, the substrate and the protective layer, as well as in a hardening of the resin present in the stack. As a result of the pressing operation a decorative panel is obtained having a melamine surface, which can be highly wear resistant. At the bottom side of the plate shaped substrate a counter layer or balancing layer can be applied, or as an alternative a decorative layer might be attached to the bottom side as well, especially in the case of laminate panels for furniture. Such a counter layer or balancing layer or any other layer at the bottom side of the laminate panel restricts or prevents possible bending of the decorative panel, and is applied in the same press treatment, for example by the provision of a resin carrying paper layer as the lowermost layer of the stack, at the side of the stack opposite said decorative layer. For examples of a DPL process reference is made to EP 1 290 290, from which it is further known to provide a relief in said melamine surface during the same press treatment or pressing operation, namely by bringing said melamine surface in contact with a structured press element, for example a structured press plate. Preferably, said relief can be in register with the pattern on the decorative layer. In case of thermoplastic foil, for manufacturing the decorative panels thermal lamination or gluing can be practiced. According to the thermal lamination process the already printed sheet is fixed with action of heat and pressure on top of a substrate. Alternatively, the decorative sheet can be thermal laminated to a surface of a transparent or translucent thermoplastic protective layer. In this latter case, after thermal lamination, a stack is formed comprising at least a plate shaped substrate, said decorative sheet and the layer. Said stack can result in a mutual connection or adherence of the layers after thermal lamination or gluing of the decorative sheet with on top of the plate shaped substrate. As a result, a decorative panel is obtained. It is possible to provide a relief in the surface of the panel, for example in the protective layer, during the same thermal lamination operation, namely by bringing said protective layer in contact with a structured press element, for example a structured roller. Preferably, said relief can be in register with the pattern on the decorative layer.

The printing of the sheet, paper or foil, by means of an analog printing process, such as by rotogravure or offset printing, at affordable prices inevitably leads to large minimal order quantities of a particular decorative paper or foil and restricts the attainable flexibility. A change of decor or pattern necessitates a standstill of the printing equipment of about 8 hours. This standstill time is needed for exchange of the printing rollers, the cleaning of the printing equipment and for adjusting the colors of the new decor or pattern to be printed.

Instead of analog printing techniques, digital printing techniques, especially inkjet printing techniques, are becoming increasingly popular for the creation of decors or patterns. Such digital techniques can enhance the flexibility in the printing of decors significantly. Reference is amongst others made to the EP 1 872 959, WO 2011/124503, EP 1 857 511, EP 2 431 190, EP 2 293 946, WO 2014/084787, WO 2015/140682 and the WO 2015/118451, where such techniques are disclosed.

During private research, the inventors have noticed that thermal lamination and/or heat pressing of the decorative paper or foil can lead to a color change in the printed patter. This may lead to an extensive color match operation to make sure that the color in the final panel is the desired one that may cause an increase of costs for sampling and interruption of production runs.

SUMMARY

The present invention aims in the first place at an alternative method for manufacturing decorative sheets that, in accordance with several of its preferred embodiments, is directed to solve one or more of the problems arising in the state of the art.

Therefore the present invention, in accordance with its first independent aspect, relates to a method for manufacturing a printed décor sheet comprising the steps of: providing a first printed substrate having a printed color patch on at least one of its surfaces, said color patch having at least one color spot; performing at least one predetermined operation on said first substrate, wherein said predetermined operation causes a color shift on said at least one color spot;

determining a first color coordinate set of said at least one color spot; determining a first ICC profile on the basis of the color coordinate set; providing a first master image and visualizing said first master image on a display device using said first ICC profile; performing an image processing operation on said first master image to obtain a second master image during said visualization; printing said second master image on a second printable substrate to obtain the décor sheet. In this way it is possible to predict what will be the color change caused by said operation and preparing the second master image while visualizing the color that will be obtained only after said operation, so that color matching operation is simplified, and the number of trials is reduced or possibly set to zero so that after the image processing step it is possible to immediately start the operation run. Preferably said predetermined operation can be performed multiple times on multiple first substrates, and a color coordinates set can be determined after each predetermined operation and one first ICC profile can be determined on the basis of said multiple color coordinates sets. In this way the ICC profile can be determined with a better approximation. Preferably said second master image can be printed using a second ICC profile, said second ICC profile can be specific of a printer used for printing the second master image. In this way, an operator can prepare a second master image visualizing the color that wants to finally have on the panel and the décor shift will be printed with a different color or color shade in such a way that the predetermined operation will cause the color on the panel to shift from the printed one to the desired one as predicted. It is noted, that as known to a person skilled in the art, an ICC profile is a set of data that characterizes a color input or output device, or a color space, according to standards promulgated by the International Color Consortium (ICC).

In the most preferred embodiment said step of providing said first printed substrate can comprise the steps of providing a first printable substrate and the step of printing said color patch on said first printable substrate. Said color patch can be printed on said first printable substrate using the same printer and/or the second ICC profile used for printing the second master image. In this way the final color after the predetermined operation can be predicted with a better approximation.

In a preferred embodiment, said first substrate can be subjected to multiple predetermined operations each causing a color shift at the at least one color spot. Preferably said first color coordinate set and/or said first ICC profile is calculated only after the last predetermined operation. In this way the operator can subsequently visualize on the display device a prediction of the color that will be obtained after all the predetermined operations have been performed.

In a preferred embodiment, the method of the first aspect comprises the step of determining a second color coordinate set for said color spot before performing said predetermined operation; determining a third ICC profile on the basis of the determined second color coordinate set; calculating the color shift from the third ICC profile to the first ICC profile. Thanks to the calculation of said color shift it can be possible for an operator to have a better understanding of the impact of the predetermined operation on the color change and it may be possible to use said knowledge in the image processing operation. In a special embodiment, the steps of determining a further color coordinate and determining a further ICC profile are performed after some, preferably each, predetermined operation and/or after one or more combination of said predetermined operations. It may also be possible calculate the color shift from the ICC profiles determined before and after one or more of said predetermined operations. In this way it may be possible to improve the understanding of each predetermined operation and/or of combinations of predetermined operations on the color change. Thanks to said improved knowledge said first ICC profile, for visualizing the first master image, can be determined on the basis of the calculated color differences. For example said first ICC profile can be determined on the basis of said calculated difference starting from a starting ICC profile, for example the ICC profile of the printer. In this way it may be possible to visualize the first master image using an ICC profile that predicts the color changes caused by one or more planned predetermined operations, so that it may be possible to plan modifications to the further processing of a manufactured décor sheet, for example a decorative panel manufacturing process starting from the décor sheet, and manufacturing said décor sheet in view of said modifications without necessarily manufacturing any samples and performing the predetermined operation with the subsequent determination of a new first ICC profile. In this case, in fact, it may be possible to determine the first ICC profile starting from the knowledge of previous calculations, for example stored in a database, according to the need.

In the preferred embodiment said color patch can comprise multiple color spots, said first color coordinates set being determined for each color spot and said first ICC profile being calculated on the basis of multiple, preferably all, first color coordinates sets. It is not excluded that in alternative embodiment technical patterns other than color patches can be used.

It is noted that each color spot on the printed foil comprises a build-up that depends on the printed color ink and the combination thereof to obtain the specific color spot, for example in a CMYK or CRYK system, possibly with the addition of spot colors like light magenta, light yellow, green, orange, brown or the like. While this build-up remains the same even after the predetermined operation the visualized color can change. It is also noted that each color spot can be composed by a certain percentage (from 0% to 100%) of at least one of the printed colors forming the set of inks. Said percentage is known as color tones, thereto each color spot can be also defined in terms of color tones.

Said determination of the ICC profile can be performed via dedicated software like for example ColorGate Production Server, X-Rite i1Profiler, Heidelberg Prinect Color Toolbox.

Said color coordinate set can be for example coordinates of the CIELAB color space. Preferably, said color coordinate set can be determined using a spectrophotometer or a scanner. In a preferred embodiment said color coordinate set can be determined using a photographic camera, more preferably a high-definition photographic camera. Using photographic cameras can provide for a color recognition that is independent from glossiness, reliefs or other surface characteristics of the first printed substrate.

The second master image can be printed using a digital printer, preferably an inkjet digital printer. Said printer can be of the multi pass or, preferably, single pass type. Said printer can be configured to print with a set of inks comprising one more color ink. Said inks can be preferably pigment containing inks and can water-based, UV-based or hydro-UV based. Oil-based or solvent-based inks are not excluded. In the most preferred embodiment said set of inks comprises at least four inks selected for the group comprising: cyan, magenta, yellow, black, red, light magenta, light red. Preferably, light magenta and/or light red ink can comprise a lower pigment content than the respective non-light ink, preferably less than a fifth of said pigment content. According to the preferred embodiment the ink used for printing on the second substrate are similar, preferably, the same provided on the first substrate.

In the most preferred embodiment, the first printable substrate and the second printable substrate can comprise one or more features in common, preferably they have the same characteristics. Preferably said features in common can be selected from weight per square meter, thickness, material, glass transition temperature, plasticizer content, Gurley value, ash content, resin penetration time. Within the context of the invention with feature in "common" it is meant the feature, in particular the value thereof, are substantially the same in the first substrate and in the second substrate, and that the value of said features can be slightly different from each other, preferably they can differ for less of the 10%, preferably less of the 5%. The inventor has found that the more similar the first and the second substrates are to each other, the higher is the accuracy with which the color change can be predicted.

In one preferred embodiment, the first substrate can be made of paper. In case the first substrate is made of paper, it is preferably in the form of a paper sheet having a base paper weight, i.e. without an ink receiving layer, higher than 20 grams per square meter, preferably between 50 to 100 grams per square meter, e.g. between 60 and 80 grams per square meter. Preferably, the paper sheet comprising the ink receiver layer shows a resin penetration time lower than 3 sec. Preferably, the paper sheet is opaque and/or contains titanium oxide as a whitening agent and/or other inorganic fillers. Alternatively, the paper sheet may be a colored, pigmented and/or dyed base paper. The paper layer can show a mean air resistance as expressed in Gurley value below 40 sec, preferably below 25 sec. Paper showings said mean air resistance are more prone to impregnation with resins.

In some embodiment it is preferred that the paper used for the first substrate is free from inorganic fillers, like whitening agents or pigments, for example titanium oxide. The paper layer can be made of 100 alfa cellulose.

In a special embodiment the first substrate can comprise a paper sheet having a base paper weight, i.e. without an ink receiving layer, lower than 50 grams per square meter, preferably between 20 to 50 grams per square meter. The paper layer according to this special embodiment can show a mean air resistance as expressed in Gurley value below 15 sec. The paper layer according to this special embodiment can be used during a "dry press operation" during HPL, CPL or DPL lamination. With dry press it is meant that the printed paper is not impregnated, but it is sandwiched between two paper layers which contain resin and the bonding is performed during lamination.

In another preferred embodiment, the first substrate is made of a polymeric material. In the most preferred embodiment, the first substrate is preferably in form of a thermoplastic foil, for example made of polyvinylchloride (PVC), polyethylene (PE) or polypropylene (PP) or PET. In this case the first substrate can comprise a thickness ranging between 40 micron and 200 micron.

The first substrate and/or the second substrate can comprise or be provided with an ink receiver layer before being subjected to said predetermined operation, in particular before being printed upon.

In some embodiments the method can comprise the step of providing the first and/or the second printable substrate with the ink receiver layer, preferably in line with said printer.

Said ink receiver layer can be or be provided in a predetermined amount between 0.5 g/sqm and 5 g/sqm dry weight.

Preferably the ink receiver layer comprises at least a binder and/or a pigment.

Preferably, said first substrate is provided with 0.2 to 10 $g/m^2$, and preferably between 0.5 and 5 $g/m^2$ dry coating weight of pigment in said ink receiver layer. Preferably said pigment has a BET surface area between 10 and 1600 $m^2/g$, and preferably between 15 and 500 $m^2/g$.

According to the most preferred embodiment, for the pigment of said ink receiver layer at least or mainly silica particles are used.

According to variants, for the pigment of said ink receiver layer at least or mainly particles are used chosen from the list consisting of calcium carbonate, alumina, aluminosilicates, ordered mesoporous materials, modified silica, organosilica, modified organosilica, organoalumina, modified alumina, aluminates, modified aluminates, organoaluminates, modified organoaluminates, zeolites, metal organic frameworks and porous polar polymers.

According to some deviant embodiments, the ink receiver layer can also be pigment free.

Preferably, said first substrate is provided with 0.2 to 7 $g/m^2$, and preferably between 0.5 and 5 $g/m^2$, dry coating weight of a binder in said ink receiver layer. According to the most preferred embodiment, for the binder in said ink receiver layer at least or mainly polyvinyl alcohols are used.

According to variants, the ink receiver layer includes, as a binder, a polymer selected from the group consisting of hydroxyethyl cellulose; hydroxypropyl cellulose; hydroxyethylmethyl cellulose; hydroxypropyl methyl cellulose; hydroxybutylmethyl cellulose; methyl sodium cellulose; carboxymethyl cellulose; sodium carboxymethylhydroxethyl cellulose; water soluble ethylhydroxyethyl cellulose; cellulose sulfate; vinylalcohol copolymers; polyvinyl acetate; polyvinyl acetal; polyvinyl pyrrolidone; polyacrylamide; acrylamide/acrylic acid copolymer; polystyrene, styrene copolymers; acrylic or methacrylic polymers; styrene/acrylic copolymers; ethylene-vinylacetate copolymer; vinylmethyl ether/maleic acid copolymer; poly(2-acrylamido-2-methyl propane sulfonic acid); poly(diethylene triamine-co-adipic acid); polyvinyl pyridine; polyvinyl imidazole; polyethylene imine epichlorohydrin modified; polyethylene imine ethoxylated; ether bond-containing polymers such as polyethylene oxide (PEO), polypropylene oxide (PPO), polyethylene glycol (PEG) and polyvinyl ether (PVE); polyurethane; melamine resins; gelatin; carrageenan; dextran; gum arabic; casein; pectin; albumin; chitins; chitosans; starch; collagen derivatives; collodion and agar-agar. The most preferred variants for the binder are polyvinyl acetates, ethylvinylacetates, block copolymers based on polyvinylacetate, block copolymers based on polyvinylalcohol, acrylates, latexes, polyvinyl derivaties, VCVAC derivatives, polyurethanes based on polyols and isocyanates, polyurethanes based on polycarbamates and polyaldehydes, e.g. both as a watery dispersion/emulsion or a watery or solvent solution.

As stated above preferred binders for the ink receiving layer include polyvinyl alcohol (PVA), but according to variants a vinylalcohol copolymer or modified polyvinyl alcohol may be applied. The modified polyvinyl alcohol may be a cationic type polyvinyl alcohol, such as the cationic polyvinyl alcohol grades from Kuraray, such as POVAL C506, POVAL C118 from Nippon Goshei.

Preferably, said ink receiver layer has, globally seen, a pigment to binder ratio between 0/1 or 0.01/1 and 25/1, preferably between 0/1 or 0.01/1 and 20/1. It is not excluded that the ink receiver layer is non uniform and shows layerwise or areawise differences in composition, in which case the above values are average values for the totality of the inkjet receiver layer.

The ink receiver layer can further comprise a crosslinking agent. Preferably, the ink receiver layer can preferably comprise a content of crosslinking agent below 5% based on dry weight of the composition. The crosslinking agent can be preferably selected from the group comprising: aldehydes, polyaldehydes, dialdehydes, alcohols, boronic acid, borax, polyalcohols, carbamates, polycarbamates, carbonic acids, glyoxal based agent, zirconium-based agents, titanates and polycarbonic acids.

The ink receiver layer can further comprise a dispersant. A dispersant is an oligomer or polymer which stabilize the liquid dispersions of pigment contained in the ink against flocculation. The dispersant can comprise polycarboxylates, polyphosphates, a polyionic polymer, preferably polyDADMAC (Polydiallyldimethylammonium chloride) polyamine or alumina salts.

Preferably, the ink receiver layer is provided with less than 10%, more preferably less than 5% based on dry coating weight of dispersant, for example between 5 and 0%. Preferably, said ink receiver layer has, globally seen, a pigment to dispersant ratio between 10/1 and 100/1.

The ink receiver layer can also comprise a flocculant, preferably a metal salt, preferably a cationic metal salt. Preferably said metal salt is chosen from the list consisting of CaCl2, MgCl2, CaBr2, MgBr2, CMA (Calcium Magnesium Acetate), NH4Cl, Calcium Acetate, ZrCl4, calcium nitrate and Magnesium Acetate. The positive ion of the dissolved metal salt will tend to neutralize the electrosteric stabilization function of the pigment contained in the ink thereby improving its absorption. The most preferred cationic metal salts are CaCl2, MgCl2, CMA, Calcium Acetate, calcium nitrate and Magnesium Acetate, as the inventors have obtained the best results with these ink reactive compounds. Said flocculant can also be chosen from the list consisting of sodiumaluminate, a double sulphate salt such as alum, polyaluminumchloride, polyacrylate, dicyandiamide (e.g. Floquat DI5 from SNF) and polyacrylamide. The flocculating agent pulls the ink pigments out of the ink dispersion. Thereby the pigments are prevented from penetration to far down into the ink receiver layer. Mainly the vehicle of the ink, e.g. the water in the case of waterbased inks, is absorbed deeper down into the ink receiver layer.

Preferably, the ink receiver layer is provided with 20 to 60%, based on dry coating weight of flocculating agent, in particular of metal salt.

The ink receiver layer may also comprise one or more of the following agents:

- Agents altering, more particularly lowering, the pH of said ink receiver layer. Preferably the pH of the ink receiver layer composition is lowered to pH 6 or lower, by selecting the amount and type of said agent, which selection is within the ambit of the skilled man. Preferably said agent is chosen from the list consisting of formic acid, tartaric acid, acetic acid, hydrochloric acid, citric acid, phosphoric acid, sulfuric acid, $AlCl_3$ and boronic acid. An adjusted, more particularly lowered pH, preferably to pH 6 or less, increases the chemical affinity of the inkjet receiver layer with the ink and will interfere with the electrosteric stabilization function on the pigment, such that the dispersion of the pigments in the ink will become destabilized quickly.
- Particle surface modifying agents or coupling agents: between 0.05 and 5 $g/m^2$, preferably between 0.2 and 2 $g/m^2$, e.g. chosen from the non-limiting list consisting of amino silanes, ureido silanes, aldehyde silanes, tetraethylorthosilicate, siliazanes, organically modified silanes, organically modified siliazanes, chlorosilanes, organically modified chlorosilanes, bissilanes, organobissilanes, silsesquioxanes, polysilsesquioxnes, silane oligomers, organically modified silane oligomers, bissilane oligomers, organically modified bissilane oligomers, oligomeric silsesquioxanes, and oligomeric polysilsesquioxanes.
- Additives: wetting agent between 0.005 and 1 $g/m^2$, preferably between 0.05 and 0.5 $g/m^2$; and/or defoaming agent between 0.005 and 1 $g/m^2$, preferably between 0.05 and 0.5 $g/m^2$; and/or fungicide between 0.005 and 1 $g/m^2$, preferably between 0.05 and 0.5 $g/m^2$.

According to the most preferred embodiment said inkjet receiver layer is present on the first substrate in the form of a unique layer. Anyway, it is not excluded that said inkjet receiver coating is in the form of two layers, wherein respectively a first layer with a first composition and a second layer with a second composition wherein said first and second composition may be either the same or different compositions.

The predetermined operation can be any operation that is able to cause a color variation on the printed décor. Preferably the predetermined operation can be selected from the group comprising: impregnation, heating, pressing, stretching, lamination or a combination thereof.

In the preferred embodiment, in case the printable substrate comprises a paper sheet, the predetermined operation involves at least impregnating the first substrate with a liquid, preferably a resin, more preferably a thermosetting resin. The thermosetting resin can preferably be a melamine-based resin. Preferably the paper sheet can be impregnated with a quantity of thermosetting resin equaling 40 to 250% dry weight of resin as compared to weight of the paper. Preferably the paper sheet can be provided with such an amount of thermosetting resin, that at least the paper core is satisfied with the resin. Such satisfaction can be reached when an amount of resin is provided that corresponds to at least 1.5 or at least 2 times the paper weight. It should be clear that the resin, which is provided on the paper sheet, is not necessarily only available in the core of the paper, but may form surface layers on both flat sides of the paper. The inkjet receiver coating may then be present on the surface of the paper with the intermediary of such a surface layer of thermosetting resin. Preferably, the obtained resin provided paper layer, i.e. after provision of the thermosetting resin, has a relative humidity lower than 15%, and still better of 10% by weight or lower. Preferably the step of providing said paper layer with thermosetting resin involves applying a mixture of water and the resin on said paper layer. The application of said mixture might involve immersion of the paper layer in a bath of said mixture and/or spraying, jetting or otherwise coating said mixture on said paper. Preferably the resin is provided in a dosed manner, for example by using one or more squeezing rollers and/or doctor blades to set the amount of resin added to the paper layer. Next to melamine-based resin, other alternatives such as urea-based resin, polyurethane-dispersion resin, acrylate dispersion resin and combinations thereof can be used.

The predetermined operation may also involve hot pressing the printed and resin provided paper sheet, at least to cure the resin. This paper sheet can be hot pressed on top of a substrate, preferably a wood-based substrate like MDF or HDF, so that this hot pressing simulates or is part of a DPL process. It is of course not excluded that this hot pressing simulates or is part of a CPL (Compact Laminate) or an HPL (High Pressure Laminate) process in which the printed paper sheet is hot pressed at least with a plurality of resin impregnated core paper layers, e.g. of so called Kraft paper, forming a substrate underneath the printed paper sheet, and wherein the obtained pressed and cured laminate layer, or laminate board is, in the case of an HPL, glued to a further substrate, such as to a particle board or an MDF or HDF board.

In case of a printable substrate comprising a thermoplastic sheet, said predetermined operation can preferably involve a thermal lamination of said thermoplastic foil with a second thermoplastic foil, for example a transparent thermoplastic foil. Alternatively, the predetermined operation can preferably involve a thermal lamination of said thermoplastic foil on a substrate, for example a flexible or rigid substrate. Said substrate can be made of a polymeric material, a wood-based material or mineral based material.

Thermal lamination can be conducted at a temperature above 80° C., preferably above 100° C.

Said image processing operation can involve a graphic design operation, and can be performed using dedicated software like for example Adobe Photoshop®, Gimp® or the like. For example, the first master image can be a scanned image of a natural or artificial material like a wood, natural stone, ceramic, metal or cement. Preferably said image processing operation is performed by a user/operator but can also be automatically activated by a software running on a control unit with the assistance of an operator whose role can be that of evaluating, modifying, intervening, confirming and/or refusing the result of said automatically activated image processing operation.

In the preferred embodiment said display device can be, for example, a monitor of a personal computer. In alternative embodiments, it is not excluded that said display device can be a sheet or any other device suitable to visualize the color of the patch.

The obtained decorative sheet can be used as decorative layer in decorative panels, for example floor, wall, ceiling or furniture panel. The said decorative panels may be of the type comprising a support layer and a top layer, the top layer comprising at least the decorative layer. According to alternative embodiments, the printed layer can be use for decorative surfaces in general, for example wallpaper.

The support layer can be a wood-based board or panel, preferably a such as to a particle board or an MDF or HDF board.

Alternatively, the support layer can be made of a polymeric material, preferably a thermoplastic material, for example made of polyvinylchloride (PVC), polyethylene (PE) or polypropylene (PP), PET. It is also possible that the support layer is comprises a mineral-based or a cement-based board, for example an MgO-based or a Portland cement board. Said mineral-based or cement-based board can comprise fiber, for example glass or cellulose fibers.

In the preferred embodiment, wherein the panel is a floor panel, the method may comprise the step of providing said support layer with coupling elements for mechanical coupling to another floor panel. Said step of providing the support layer with coupling element is preferably performed after that the decorative layer has been provided on the support layer. It is noted that said support layer can also be in form of a large board that is cut into multiple laminate panels.

The method of the invention can comprise the step of providing said top layer, including at least said decorative layer, onto said support layer. In particular, the decorative layer can be pressed, heat pressed, thermal laminated or glued on top of the support layer. in the most preferred embodiment, the decorative layer is preferably heat pressed on top of the support layer after that it has been impregnated with a resin. Said resin being preferably a melamine-based resin. Said impregnation and/or said heat pressing can be performed substantially in the same way as per the above mentioned predetermined operation.

The top layer can further comprise a wear layer, preferably a transparent layer and possibly comprising hard particles. Said wear layer can comprise a paper sheet impregnated with a resin, preferably the same impregnating the printed layer. In some embodiments, said wear layer can comprise a thermoplastic sheet for example made of PVC. The protective layer can be thermal laminated on top of the decorative layer. The thermal lamination of the protective layer on the decorative layer can happen before, during and or after the decorative layer has been provided on the support layer. For example, the protective layer is thermal laminated on top of the decorative layer in the same step of thermal lamination of the decorative layer itself on top of the support layer. In a second preferred embodiment, the protective layer is thermal laminated on top of the decorative layer to form the top layer and subsequently the top layer is either thermal laminated or glued on top of the support layer.

The method of the invention may comprise the step of forming a relief on the surface of said panel. Said relief is preferably formed at least in said top layer. In the most preferred embodiment the relief is in register with the printed décor provided on the printed layer, i.e. the relief has structural feature corresponding to structural features of the printed décor. For example, in case of a printed décor representing a wood imitation the relief has an excavation shaped to imitate a wood pore where the printed décor shows a wood pore. Thanks to the inventive solution proposed herein, it is possible to improve the alignment between the printed décor and the relief since any deformation of the printed décor that can occur before and/or during the alignment of the printed décor with the relief is taken into account.

The relief can be embossed in the top layer during the heat pressing step using an embossment plate or roller. The relief can also be obtained before or after that the top layer is provided on the support layer.

It is noted that in some alternative embodiments, the first ICC profiles can be determined starting from a first printed pattern that differs from printed color patch. For example, said first ICC profile can be determined by a color measurement applied on a predetermined number of points in the printed pattern. According to said alternative embodiments, the first ICC profile can be determined from a reference decorative pattern. For example, an oak wood pattern can be chosen as a reference for building a first ICC profile dedicated to the printing of various oak imitating wood patterns. For example, said reference decorative pattern has been printed via inkjet printing or analogue rotogravure printing.

BRIEF DESCRIPTION OF THE DRAWINGS

With the intention of better showing the characteristics according to the invention, in the following, as an example without limitative character, an embodiment is described, with reference to the accompanying drawings, wherein.

DESCRIPTION OF NON-LIMITING EMBODIMENTS

Figures 1, 2, 3, 4:
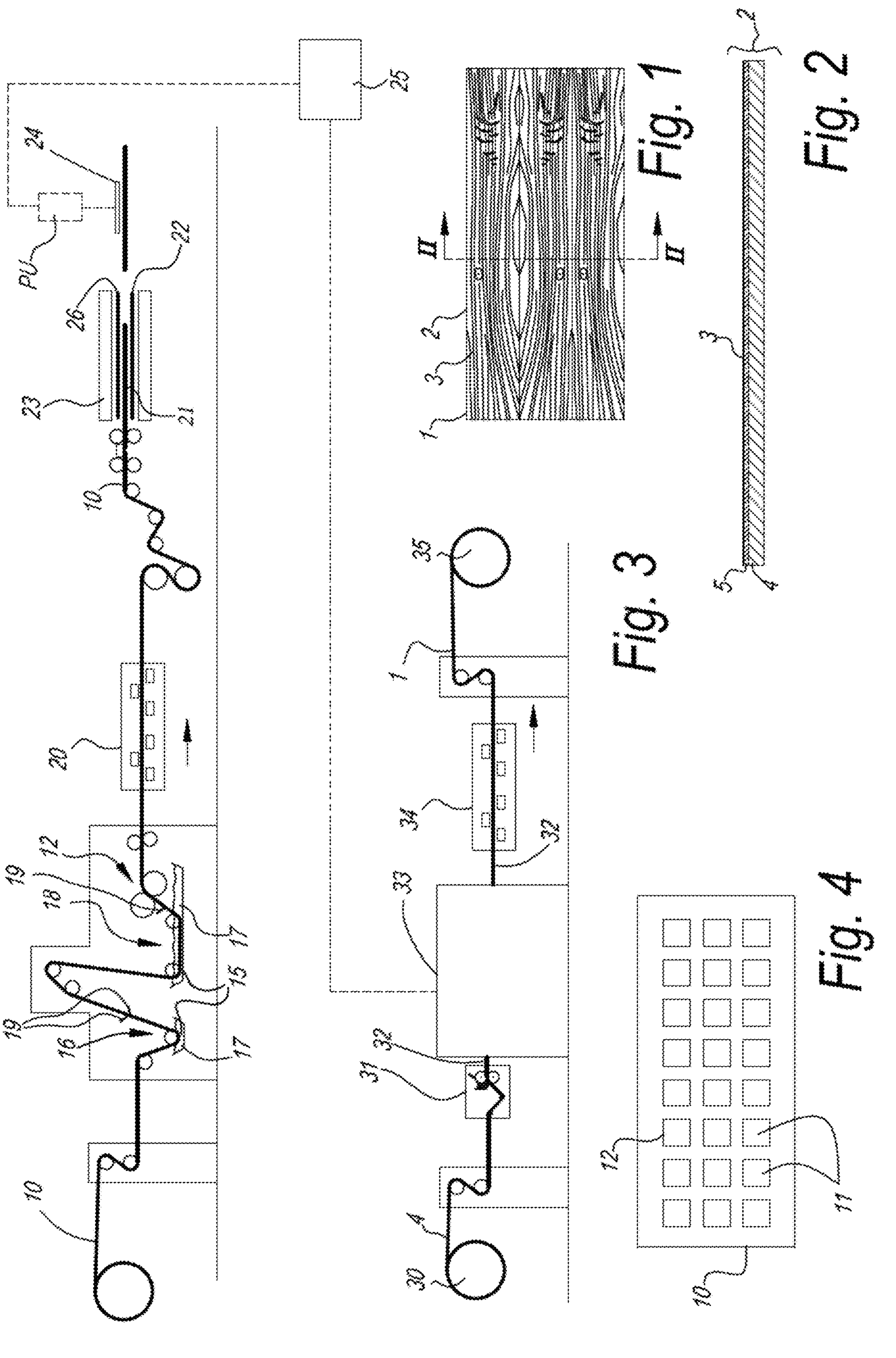
FIG. 1 schematically shows a top view of a decorative sheet obtainable through the method of the invention.
FIG. 2 shows an enlarged view of a section according to plane II-II of FIG. 1.
FIG. 3 schematically shows some steps in a method in accordance with the first aspect of the invention.
FIG. 4 schematically shows a top view of a printed substrate used in the method of the invention.

FIG. 1 a decorative sheet 1 for laminate panels obtainable through the method of the invention. Said decorative sheet 1 comprises a printed substrate 2 having a decorative pattern 3 on one of its surfaces. In the example, the decorative pattern 3 represents a wood décor.

FIG. 2 shows an enlarged view of the section along plane II-II of FIG. 1. FIG. 2 shows that the printed substrate 2 comprises a base paper 4 and an ink receiver layer 5 that coats the surface of the base paper layer 4 that is provided with the printed pattern 3.

The base paper 4 of the embodiment comprises a weight, i.e. without an ink receiving layer 5, higher than 20 grams per square meter, preferably between 50 to 100 grams per square meter, e.g. between 60 and 80 grams per square meter. Preferably, the base paper 4 comprising the ink receiver layer 5 shows a resin penetration time lower than 3 sec. Preferably, the base paper 4 is opaque and/or contains titanium oxide as a whitening agent and/or other inorganic fillers. Alternatively, the base paper 4 may be a colored, pigmented and/or dyed base paper. The base paper 4 can show a mean air resistance as expressed in Gurley value below 40 sec, preferably below 25 sec.

In the example the ink receiver coating 5 comprise polyvinyl-alcohol as binder, silica particles as pigments and a cationic metal salt chosen from the list consisting of CaCl2, MgCl2, CaBr2, MgBr2, CMA (Calcium Magnesium Acetate), NH4Cl, Calcium Acetate, ZrCl4, calcium nitrate and Magnesium Acetate.

Said ink receiver coating 5 is provided in a predetermined amount between 0.5 g/sqm and 5 g/sqm on the base paper sheet 4.

FIG. 3 shows some step of a method for obtaining the decorative sheet 1. The method comprises a first step of providing a first printed substrate 10 as shown in FIG. 4. The first printed substrate 10 preferably comprises a base paper 4 and an ink receiver layer 5 as described above in relation to the decorative sheet 1. The first printed substrate 10 comprises a color chart 11 having a plurality of color spots 12. Each color spot 12 comprises a printed color characterized by a specific color having respective visual color coordinates. Said color coordinates can be identified in the CIELAB space. The color chart 11 is preferably printed by inkjet printing using a plurality of inks preferably selected from the group comprising: cyan, magenta, red, yellow and black, possibly with the addition of spot-colors like light magenta, light yellow, green etc. Thereto each color spot 12 comprises also a set of color coordinate that can be expressed in the CMYK or CRYK space. In particular, each color spot 12 is composed by a certain percentage (from 0% to 100%) of at least one of the printed colors forming the set of inks, thereto each color spot is also defined in terms of color tones.

The first substrate 10 is subjected to a predetermined operation shown in FIG. 3. In the example, the predetermined operation involves impregnating the first substrate 10 with a thermosetting resin 15, in particular a melamine-based resin. In particular, the first substrate 10 is transported to a first impregnation station 16 where said first substrate 10 is immersed in a bath 17 of said thermosetting resin 15, more particularly a mixture of water and thermosetting resin composition. The first substrate 10 is then allowed to rest while in this case being transported upwards. The resting allows for the resin 15 to penetrate the core of the first substrate 10. The first substrate 10 then comes into a second impregnation station 18 where it is, in this case, again immersed in a second bath 17 of resin 15, more particularly a mixture of water and resin. A set of squeezing rollers and doctor blades 19 allows to dose the amount of resin applied to the first substrate 10.

The first substrate 10 is then dried and its residual humidity level is brought to below 10%. In the example a hot air oven 20 is used, but alternatively other heating equipment can be used, such as microwave or infrared drying equipment.

In the example the first substrate 10 is cut to sheet 21 and heat pressed between a substrate 22, for example made of MDF, and a transparent layer 26 by means of a hot press 23. Said transparent layer can be for example a resin impregnated overlay paper.

The heat pressing causes a color variation at the color spots 12 in the color chart 11. Although the CMYK or CRYK color coordinates of the printed color spots 12 remain the same, the visual color coordinate in the CIELAB space change. The new color coordinate can be measured with a scanner or a spectrophotometer 24 to obtain a first set of color coordinates for each color spot 12.

Said first sets of color coordinates are sent to a processing unit PU, that determines a first ICC profile that is configured to simulate the visual appearance of the color chart, after the color change, on a display device 25, preferably the monitor of a personal computer.

The first ICC profile is used to visualize on said display device 25 a first master image, in the example a scanned image of a real natural wood. In this way a graphic designer can visualize on the display device 25 what will be the color change after printing and after the predetermined operation. Therefore, the operator can perform an image processing operation on said first master image while visualizing it through the first ICC profile, so that what will be the final visual result on a laminate panel can be simulated, to thereby obtaining a second master image.

Subsequently a blank paper layer 4 as described with reference to FIG. 2 can be uncoiled from a first roll 30 and fed to a coating station 31 to be coated with the ink receiver layer 5, having the features described above, to obtain a second printable substrate 32.

The second printable substrate 32 is transported to a printer 33 for printing the second master image on the second printable substrate 32. The printer 33 of the example is a single pass inkjet printer configured to print with a plurality of ink, preferably at least four inks selected from the group comprising: cyan, magenta, red, yellow, black. The inks are preferably pigment containing ink, more preferably water-based. Said second master image is printed using a second ICC profile that is preferably specific for the printer. Preferably said second ICC profile is the same as that used to print the color patch 11 on the first substrate 10.

The printed second substrate 32 is then then dried to obtain the decorative sheet 1. In the example a hot air oven 34 is used, but alternatively other heating equipment can be used, such as microwave or infrared drying equipment.

The obtained decorative sheet 1 is then rolled up in a second roll 35.

Figure 5:
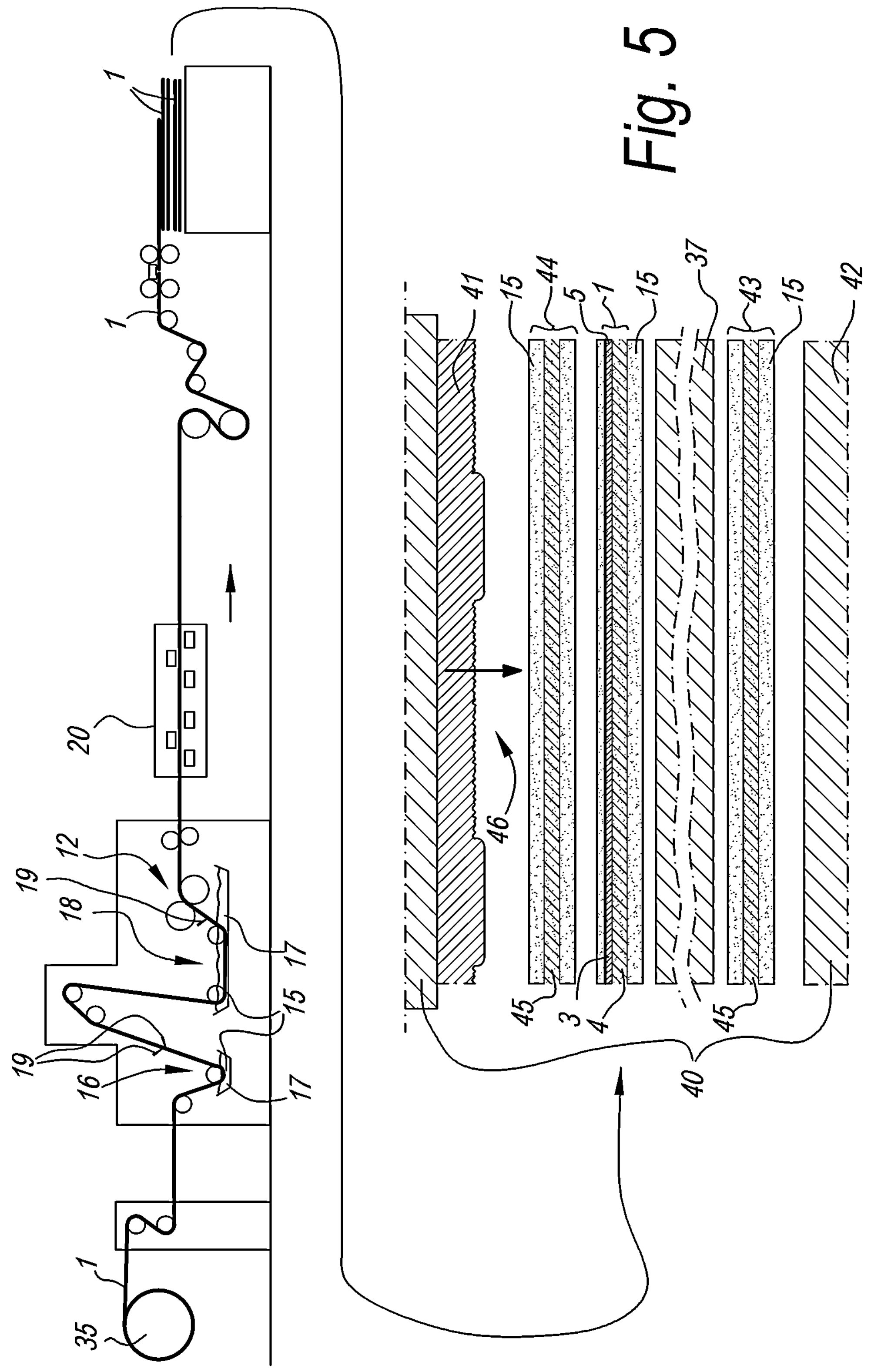
FIG. 5 schematically shows some steps in a method for manufacturing laminate panel.
Figure 6:
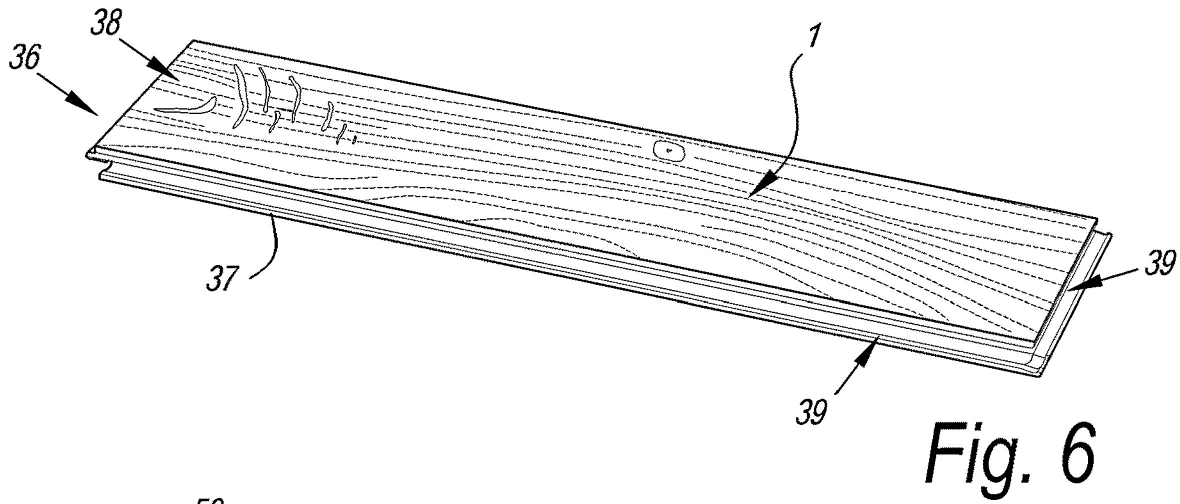
FIG. 6 shows a perspective view of a panel obtainable through the method of FIG. 5.

FIG. 5 shows some steps of a method for manufacturing a laminate panel 36, as illustrated in FIG. 6, starting from the decorative sheet 1.

The laminate panel 36 at least comprise a substrate 37, for example of HDF or MDF, and a top layer 38. The top layer 38 comprises the decorative layer formed by the decorative sheet 1. In the example the decorative panel 36 is a floor panel comprising coupling means 39 on the long and short edges for coupling with adjacent floor panels in a floor covering. As illustrated in FIG. 6 such coupling means or coupling parts 39 an basically have the shape of a tongue and a groove.

In particular, FIG. 5 shows that the decorative sheet 1 is subjected to the abovementioned predetermined operation, in the example is impregnated with the melamine resin 15. Said impregnation is preferably conducted in the same way as for the first substrate and as described in FIG. 3.

FIG. 5 further illustrates that a the impregnated decorative sheet 1 is taken up in a stack to be pressed in a short daylight press 40 between upper and lower press plates 41-42. Said stack comprises from bottom to top a counter layer 43, the plate shaped substrate 37, the abovementioned impregnated decorative sheet 1 and a wear layer 44, wherein the counter layer 43 and the wear layer 44 both comprise a paper sheet 45, in case of the wear layer 44 called overlay paper, and resin 15. The stack is then pressed and the press treatment results in a mutual connection between the constituent layers 1-43-44 including the substrate 37, of the stack, as well as in a hardening or curing of the available resin 15. More particularly here a polycondensation reaction of the melamine-based resin takes place, having water as a by-product.

The upper press plate 41 is a structured press plates having a structure relief 46 that provides a relief in the melamine surface of the panel 30 during the same press treatment, by bringing the structured surface of the upper press plate 41 into contact with the melamine of the wear layer 44.

It is noted that preferably the thermal lamination step of FIG. 3 is preferably performed in the same way as described in relation to FIG. 5.

Figure 7:
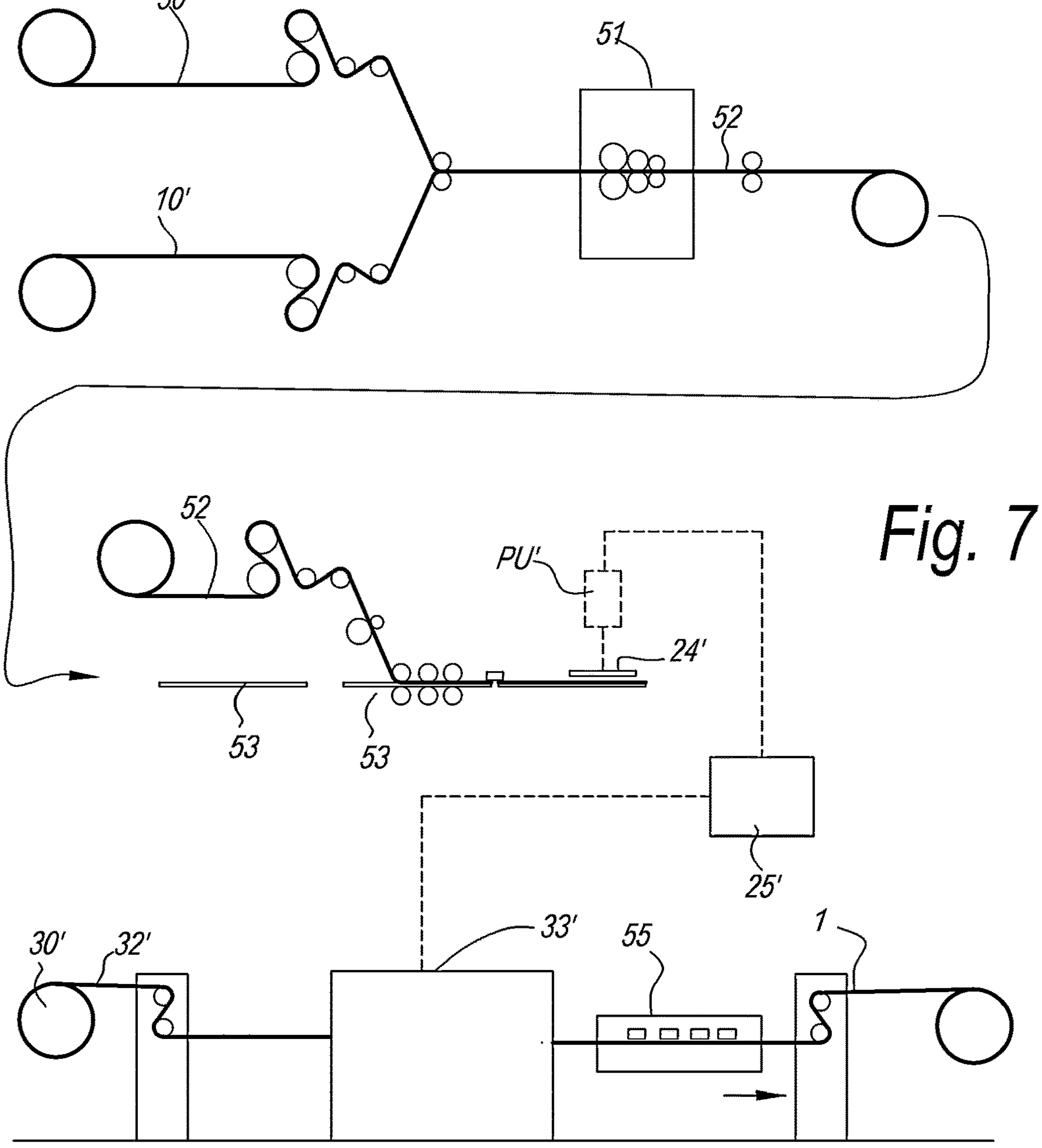
FIG. 7 shows some steps of an alternative embodiment of the method of the invention.

FIG. 7 shows an alternative embodiment of the invention wherein the first printed substrate 10', comprises a base sheet made of thermoplastic material, preferably PVC. FIG. 7 shows the predetermined operation that in the example involves thermal laminating, in a thermal lamination station 51, the printed substrate 10' to a transparent wear layer 50 made of thermoplastic material, preferably PVC, to form a top layer 52 for a laminate panel.

The obtained top layer 52 is subsequently attached to a substrate 53, for example made of thermoplastic material like PVC or a mineral based board, via gluing or thermal lamination.

The thermal lamination causes a color variation at the color spots 12 in the color chart 11. Although the CMYK or CRYK color coordinates of the printed color spots 12 remain the same, the visual color coordinate in the CIELAB space change. The new color coordinate can be measured with a scanner or a spectrophotometer 24' to obtain a first set of color coordinates for each color spot 12.

Said first sets of color coordinate is sent to a processing unit PU', that determines a first ICC profile that is configured simulate the visual appearance of the color chart, after the color change, on a display device 25', preferably the monitor of a personal computer.

The first ICC profile is used to visualize on said display device 25' a first master image, in the example a scanned image of a real natural wood. In this way a graphic designer can visualize on the display device 25' what will be the color change after printing and after the predetermined operation. Therefore, the operator can perform an image processing operation on said first master image while visualizing it through the first ICC profile, so that what will be the final visual result on a laminate panel can be simulated, to thereby obtaining a second master image.

Subsequently a second printable substrate 32' in the form of a thermoplastic material sheet can be uncoiled from a first roll 30' and fed to a printer 33' for printing the second master image on the second printable substrate 32'. The printer 33 of the example is a single pass inkjet printer configured to print with a plurality of ink, preferably at least four inks selected from the group comprising: cyan, magenta, red, yellow, black. In this alternative example the inks are preferably pigment containing ink, more preferably UV-based or hydro-UV based, anyway it is possible that water-based inks are used. It is noted that since in this alternative example the inks are UV-based the second printable substrate 32', and preferably the first printed substrate 10', is free from an ink receiver layer, anyway it is not excluded that an ink receiver layer is used or that any other coating below or above the printed pattern is applied. Said second master image is printed using a second ICC profile that is preferably specific for the printer. Preferably said second ICC profile is the same as that used to print the color patch 11 on the first substrate 10'.

The printed second substrate 32' is then subjected to UV curing, via UV lamps 55, of the inks to obtain the decorative sheet 1.

The present invention is in no way limited to the above described embodiments, but such methods, paper layers, panel may be realized according to several variants without leaving the scope of the invention.

The invention is further disclosed by the following item list as defined by the below numbered items.

1. A method for manufacturing a decorative sheet 1 for decorative panels comprising the steps of:
   a) providing a first printed substrate 10 having a printed color patch 11 having at least one printed color spot 12;
   b) subjecting the first printed substrate 10 to at least a predetermined operation that cause a color shift of said color spot 12;
   c) determining a first color coordinate set for said color spot 12;
   d) determining a first ICC profile using said first set of color coordinate set;
   e) visualizing a first master image on a display device 25 using said first ICC profile;
   f) performing an image processing operation on said first master image to obtain a second master image during said visualization;
   g) printing said second master image on a second substrate 32 to obtain the decorative layer 1.
2.—The method according to item 1, wherein in that said second master image is printed using a second ICC profile, preferably a specific ICC profile of a printer 33 used for printing said second master image.

3.—The method according to item 1 or 2, wherein said step a) involves providing a first printable substrate 10 and printing said color patch 11 on said first printable substrate 10 to obtain said first printed substrate.

4.—The method according to item 3, wherein said color patch 11 is printed using a second ICC profile that is the same used to print the second master image.

5.—The method according to any of the preceding items, wherein said color patch 11 comprises multiple color spots 12.

6.—The method according to any of the preceding items, wherein said first substrate 10 and/or said second substrate 32 comprises paper layer or a thermoplastic foil.

7.—The method according to any of the preceding items, wherein said first substrate comprises an ink receiver layer.

8.—Method according to any of the preceding items wherein said predetermined operation is selected between the group comprising: impregnating, heating, pressing, gluing, covering with a transparent layer and/or laminating.

9.—Method according to any of the preceding items, wherein said printing operation is performed via inkjet printing, preferably single pass printing.

10.—Method according to any of the preceding item, wherein the second substrate 32 comprises one or more features in common with the first substrate 10, preferably said feature in common belong to the group comprising: weight, thickness, Gurley value, resin penetration time, ash content, glass transition temperature, plasticizer content, composition.

11.—Method according to any of the preceding item, wherein the second substrate 32 is the same of the first substrate 10.

12.—Method according to any of the preceding item, wherein said set of color coordinates is determined using a spectrophotometer, an optical scanner or a photographic camera.

13.—The method according any of the preceding items, wherein said first substrate 10 is subjected to multiple predetermined operation each causing a color shift, preferably steps c) and d) are performed after some, preferably each, predetermined operation and/or after one or more combination of said predetermined operations.

14.—The method according to item 13, wherein the sets of color coordinates measured after each predetermined operations are stored in a database.

15.—The method according to item 14, wherein the method involves planning one or more predetermined operation to be performed on the decorative sheet, and the step of determining the first ICC profile on the basis of said plan and of the sets of color coordinate stored in the database.

16.—The method according any of the preceding items, wherein a second color coordinate set is determined for said at least one color spot 12 before performing said predetermined operation, preferably a color shift between said first and second color coordinate set is calculated.

17.—The method according to any of the preceding items, wherein said predetermined operation is performed multiple times on multiple first substrate 10 and wherein one first set of color coordinates is determined for each first substrate 10 to obtain a plurality of sets of color coordinate for the color spot 12, and wherein said first ICC profile is determined on the basis of said plurality of sets of color coordinate.

18.—The method according to any of the preceding items, wherein said display device 25 is a screen or a monitor, preferably of a personal computer.

19.—The method according to any of the preceding items, wherein said printing operation is performed using one or more inks, preferably pigment containing inks, preferably water-based, UV-based, hydro-UV-based, oil-based or solvent-based.

20.—The method according to any of the preceding items, wherein said inks are selected from the group comprising: cyan, magenta, red, yellow, black, light cyan, light magenta, light red.

21.—The method according to any of the preceding items, wherein said first ICC profile is determined via a software, preferably ColorGate Production Server, X-Rite i1Profiler or Heidelberg Prinect Color Toolbox.

22.—Method for manufacturing decorative panels having a top layer comprising a decorative sheet 1, wherein said decorative sheet 1 is obtained in the method according to any of the preceding items.

23.—Method according to item 22, wherein it comprises the step of performing said predetermined operation on the decorative sheet.

24.—Method according to item 22 or 23, wherein the panel comprises a substrate, preferably made of MDF, HDF, thermoplastic material, mineral-based or cement-based boards.

25.—Method according to any of items from 22 to 24, comprising providing a transparent layer on top of the decorative sheet.

26.—Method according to any of items from 22 to 24, wherein said decorative panel is a floor, wall, ceiling and/or furniture panel.

The invention claimed is:

1. A method for manufacturing a decorative sheet for decorative panels, the method comprising:

a) providing a first printed substrate having a printed color patch having a printed color spot;

b) subjecting the first printed substrate to at least a predetermined operation that causes a color shift of the color spot;

c) determining a first color coordinate set for the color spot after the predetermined operation;

d) determining a first ICC profile using the first color coordinate set;

e) visualizing a first master image on a display device using the first ICC profile;

f) performing an image processing operation on the first master image to obtain a second master image during the visualization;

g) printing the second master image on a second substrate to obtain the decorative sheet.

2. The method according to claim 1, wherein the second master image is printed using a second ICC profile.

3. The method according to claim 1, wherein said-step a) involves;

providing a first printable substrate; and printing the color patch on the first printable substrate to obtain the first printed substrate.

4. The method according to claim 3, wherein the color patch is printed using a second ICC profile that is the same as that used to print the second master image.

5. The method according to claim 1, wherein the first substrate and/or the second substrate comprises paper layer or a thermoplastic foil.

6. The method according to claim 1, wherein the predetermined operation is one of impregnating, heating, pressing, gluing, covering with a transparent layer and/or laminating.

7. The method according to claim 1, wherein the printing is an inkjet printing.

8. The method according to claim 1, wherein the second substrate comprises one or more features in common with the first substrate.

9. The method according to claim 1, wherein the second substrate is the same as the first substrate.

10. The method according to claim 1, wherein the first substrate is subjected to multiple predetermined operations, each causing a color shift.

11. The method according to claim 10, wherein sets of color coordinates measured after each predetermined operation are stored in a database.

12. The method according to claim 11, wherein the method involves planning one or more predetermined operations to be performed on the decorative sheet; and determining the first ICC profile on the basis of the plan and on the sets of color coordinates stored in the database.

13. The method according to claim 1, wherein a second color coordinate set is determined for the color spot before performing the predetermined operation.

14. The method according to claim 1, wherein the predetermined operation is performed multiple times on multiple first substrates;

wherein a first color coordinate set is determined for each first substrate to obtain a plurality of first color coordinate sets for the color spot, and wherein the first ICC profile is determined on the basis of the plurality of first color coordinate sets.

15. The method according to claim 1, wherein the printing is performed using one or more inks.

16. The method according to claim 15, wherein the inks are selected from the group comprising: cyan, magenta, red, yellow, black, light cyan, light magenta, and light red.

17. A method for manufacturing a decorative panel having a top layer with a decorative sheet, wherein the decorative sheet is obtained according to the method of claim 1.

18. The method according to claim 17, further comprising performing the predetermined operation on the decorative sheet.

19. The method according to claim 17, wherein the panel comprises a substrate.

20. The method according to claim 17, further comprising providing a transparent layer on top of the decorative sheet.

* * * * *